Feb. 14, 1950   H. BLOOMFIELD   2,497,289
POTATO CUTTER
Filed Oct. 2, 1947   2 Sheets-Sheet 1
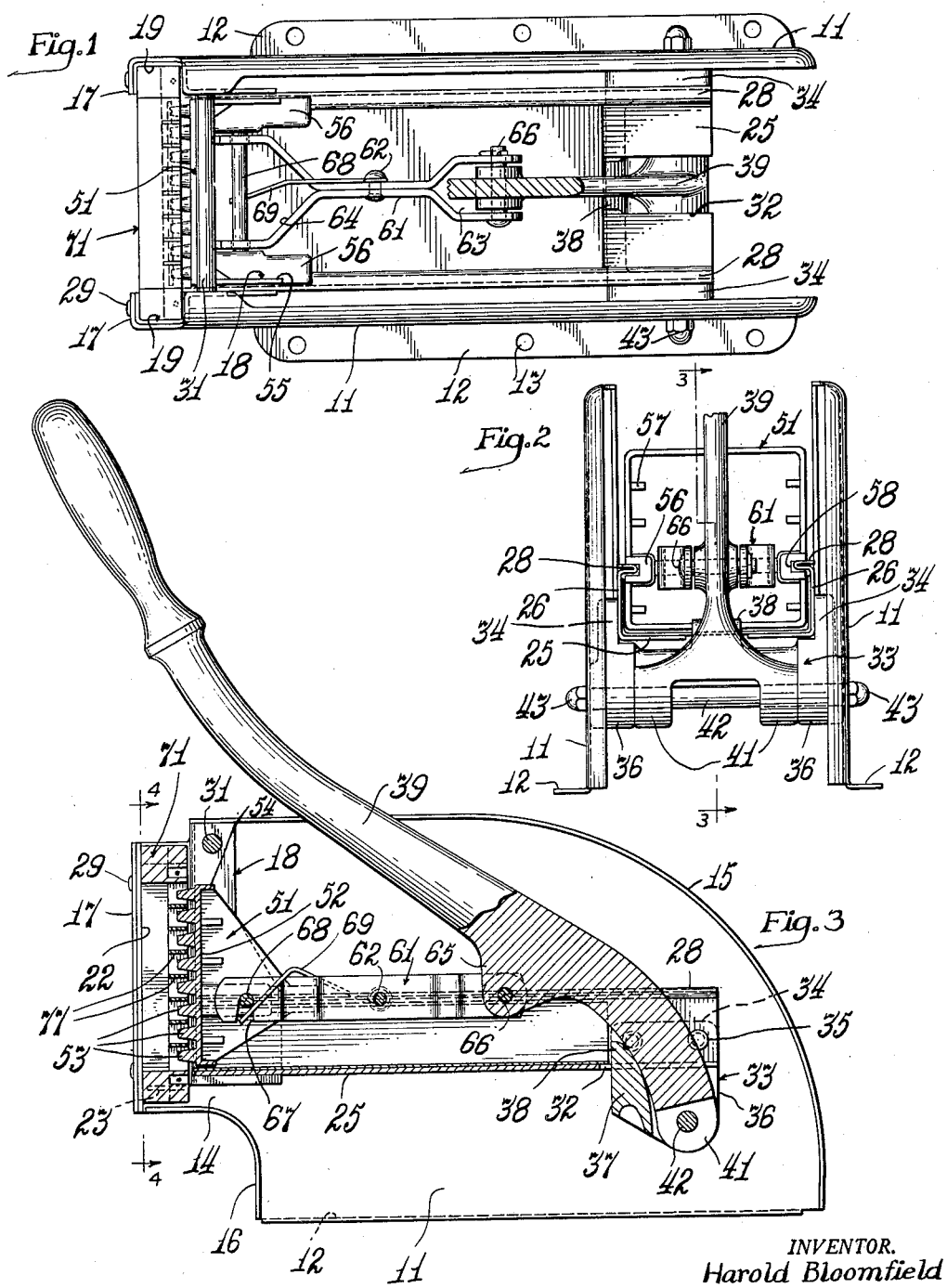
INVENTOR.
Harold Bloomfield
BY Feb. 14, 1950     H. BLOOMFIELD     2,497,289
POTATO CUTTER
Filed Oct. 2, 1947     2 Sheets-Sheet 2

INVENTOR.
Harold Bloomfield

Patented Feb. 14, 1950

2,497,289

UNITED STATES PATENT OFFICE 2,497,289

POTATO CUTTER

Harold Bloomfield, Chicago, Ill.

Application October 2, 1947, Serial No. 777,459

3 Claims. (Cl. 146—169)

The invention relates to vegetable cutting machines, and more particularly to a novel, inexpensively constructed machine for slicing potatoes in preparation for cooking and serving them in a style and form commonly referred to as "French fried potatoes."

Potatoes prepared for serving as "French fries" are cut into strips by slicing the potatoes preferably lengthwise. The strips preferably are from one-fourth to three-eighths of an inch square in section. Obviously such slicing of the potatoes by hand is a tedious, time-consuming operation, and various manually operable slicing devices of known construction presently available are objectionable either because of their costly construction, the difficulty of operation, and/or the inconvenience involved in maintaining the device clean and sanitary.

It is therefore an object of the invention to provide a novelly constructed durable slicing device of the character referred to which is not expensive to manufacture, but which, when in use, overcomes all of the objectionable characteristics hereinabove noted as being present in known devices.

Another object of the invention is to provide a slicing device which is easy to operate and may be disassembled easily for cleaning and quickly reassembled.

Another object is to provide a slicing device of the character referred to with a novelly constructed cutter die and mounting therefor.

Other and further objects of the present invention will be apparent from the following description and claims, and are illustrated in the accompanying drawings, which, by way of illustration, show an exemplary embodiment and the principles thereof. Other embodiments of the invention embodying the same principle may be used, and structural changes may be made as desired by those skilled in the art, without departing from the present invention and the purview of the appended claims.

In the drawings:

Fig. 1 is a plane view of the cutting device embodying the features of the present invention, showing the operating lever partly broken away.

Fig. 2 is an elevational view of the device viewed from its rear end, and showing the operating lever partly broken away.

Fig. 3 is a longitudinal vertical central sectional view, taken substantially on line 3—3 of Fig. 2, showing parts in elevation.

Fig. 4 is a vertical sectional view taken substantially on line 4—4 of Fig. 3.

Fig. 5 is a fragmentary perspective view of the cutter.

Fig. 6 is a perspective view of the pressure head.

Fig. 7 is a fragmentary perspective view showing one of the guides for the cutter and related portions of the device.

Referring to the accompanying drawings, the cutting device includes a pair of spaced apart vertical side walls 11, each fabricated from sheet material and having its lower marginal edge folded outwardly to provide a foot portion 12 substantially coextensive with its length having spaced apertures 13 therein to receive anchoring screws (not shown) for securing the device to a firm support. The side walls 11 each include a forwardly extending portion 14 and inwardly turned marginal flanges 15, 16 and 17, the latter flange being on the forward edge of the portion 14.

A bracket 18, best shown in Fig. 7, is mounted on the inside face of each of the forwardly extending portions 14 of the side walls 11. These brackets preferably are fabricated from sheet material and include a channel portion or guide 19 having spaced side walls 21 and 22 and a bottom wall 23. The marginal edge portion of the side wall 21 is disposed substantially at right angles to said wall, as at 24, and is formed relatively wide at its lower extremity to provide a firm mounting area for the front end of a horizontal channel or trough 25 arranged between and extending rearwardly from the brackets 18. As illustrated, the channel 25 has its upwardly extending side walls 26 suitably secured to the bracket portions 24 as by spot welding or rivets 27. The free upper edges of each of the channel walls 26 are suitably folded over inwardly and then outwardly to define a pair of longitudinally extending opposed rails 28.

It should be observed at this time that the horizontal channel 25 is firmly secured at its forward end to the brackets 18, and that said brackets are secured firmly one to each of the side walls 11 by means of rivets or spot welds 29 joining the related guideway walls 22 and the wall flanges 17. Additional rigidity is afforded this front end assembly by means of a tie rod 31 which bridges the horizontal channel 25 and is secured firmly at its ends to the edge portions 24 of brackets 18 adjacent their upper ends.

The horizontal channel 25 extends rearwardly from its mounted end a substantial distance and terminates short of the rear end of the side walls 11 as shown. A portion of its bottom wall is suitably cut away as at 32 to provide a substantially rectangular opening communicating with the rear edge thereof for a purpose to be described presently.

A bearing bracket, generally indicated at 33, is secured firmly to the rear end of the horizontal channel 25. Upon referring to Figs. 2 and 3 it will be observed that this bracket extends transversely across the bottom of channel 25 and has upwardly extending ears 34 which are secured firmly to the channel side walls 26 as by means of rivets 35. The portion of the bearing bracket extending beneath the bottom wall of the channel 25 is suitably cut away to define a pair of spaced journals 36 and a connecting wall portion 37, which wall portion has an enlargement on its upper edge propecting through the slot 32 as at 38 to provide a positive stop at the rear end of channel 25, the purpose of which will be explained hereinafter.

An operating lever 39, having a bifurcated end 41, is suitably journalled in the bearing bracket 33, a pin 42 being provided for this purpose. The pin 42 extends through the bearing journals 36 and through the side walls 11 so as to receive on its threaded ends, cap nuts 43. It is evident that the journal pin 42 not only affords means for pivotally connecting the lever 39 to the bearing bracket 33, but also affords means whereby the rear end of the horizontal channel 25 is firmly supported between the side walls 11.

The lever 39 is provided with means for manually actuating a pressure head 51 which is slidable along the channel or trough 25 on the rails 28. The pressure head is best shown in Fig. 6. Upon referring to that disclosure, said head will be seen to constitute an integral structure, preferably a die casting, having a substantially square body or front wall 52 formed on its front face with a plurality of spaced apart protuberances 53.

A flange 54 surrounds the rear face of body 52, which flange is provided on two opposed sides with rearwardly extending substantially triangularly shaped enlargements 55 suitably reinforced by ribs 56 and webs 57 located on the inner faces of the enlargements 55. The outside faces of the enlargements 55 have single grooves 58 formed therein which open on each edge end thereof and are in substantial registry with the related ribs 56. The grooves 58 are disposed at right angles to the plane of the front wall 52 and are each adapted to slidably receive one of the channel rails 28 when the pressure head is in position thereon. This construction affords means whereby the pressure head 51 may move freely from the front end of the channel 25 rearwardly until its lower margin is brought into abutment with the stop 38.

Movement of the pressure head towards and away from the front end of the channel 25 is accomplished by operating the lever 39 which is operatively connected thereto as by means of a built-up link structure 61. The link structure 61 preferably consists of a pair of suitably shaped straps of sheet material joined together midway between their ends as by rivet 62 and having their opposed ends spread apart to provide forks 63 and 64. The fork 63 is pivotally secured to an apertured ear 65 on the lever 39 as by means of a pintle pin 66. The other forked end 64 of the link 61 has each of its legs provided with a downwardly opening slot 67 for disengageable engagement over a tie rod 68 carried by the pressure head 51 and extending between the ribs 56 on the side walls 55 thereof.

Unintended disengagement of the link 61 with the tie rod 68 is avoided by the provision of a suitable resilient element such as a wire spring 69, which is anchored at one end to the link rivet 62 and has its free other end extending downwardly between the legs of fork 64 into the path of the crosspin 68 when the latter is engaged in the slots 67. Thus, so far as the structure of the device has already been described, it should be quite evident that movement of the lever 39 about its pivot 42 will reciprocate the pressure head 51 forwardly and rearwardly along the channel 25.

When the device is in use the channel 25 serves as a trough into which the article (potato) to be processed is initially placed. Such positioning of the article is effected when the pressure head 51 is in its rearmost position so that, when the lever 39 is actuated to carry the pressure head forwardly along the trough, the article therein is urged forwardly in advance of the pressure head and, in the absence of any obstruction in its path, it would be discharged off of the forward end of the channel 25. However, means is provided at the forward end of the channel 25 to cut or slice the article as it moves forward off the front end of the channel 25.

The cutting or slicing means is best illustrated in Figs. 3, 4 and 5, and in the present instance it consists of a lattice-like cutter generally indicated at 71. As illustrated, the cutter 71 is substantially square and includes an open frame 72 including side walls 73 and top and bottom walls 74. The frame may be cast as a unit as shown, or it may be a build-up structure without impairing its utility. In the present disclosure the frame 72 is fabricated in a single piece, preferably by die casting, and it has its corners suitably cut away as at 75 for a purpose to be described presently.

A plurality of vertical and horizontal cutter blades, 76 and 77 respectively, extend across the opening within the cutter frame 72. These blades are suitably slotted at spaced intervals and on opposed edges so as to interengage one another at their junctions and so nest as to locate their cutting edges 78 in a common plane substantially flush with one face of the frame 72. The cutter blades are held in place in the frame 72 by having their end portions seated in slits 79 in the side walls 73, and top and bottom walls 74 respectively, of said frame, and each end portion is apertured to receive an anchor pin 81. The anchor pins rest in slots 82 formed in the face of the frame 72. At least two of the anchor pins 81 have their ends embedded in the walls 74 in which they are mounted so as to lock the blade assembly in place. This may be accomplished by driving said anchoring pins into place through suitable holes 83 constituting extensions of the slots 82 in said walls and using pins which are greater in length than the length of said related slots. This construction and mode of assembly afford means whereby the cutter blades may be removed as a unit from the frame 72, it being an obviously simple operation to drive the anchor pins 81 out of the walls 74, whereupon the two remaining anchor pins may be withdrawn easily and quickly from the related slots with the blades remaining intact thereon.

The cutter 71 is adapted to be mounted in the opposed vertical guideways 19 previously described and located at the forward end or the trough 25. The inwardly turned bottom walls 23 of said guideways provide stops to limit downward insertion of the cutter, and because of the cut-away corner portions 75 thereof said cutter is positioned with the top or inside face of its bottom wall 74 substantially in the plane of the bottom wall of the trough 25.

A leaf spring 84 mounted in each guideway 19 prevents rattling of the cutter when in place. If desired, a liner 85 may be firmly mounted in the horizontal channel or trough 25 to facilitate cleaning and to afford means whereby the article being sliced will slide freely and easily with a minimum amount of resistance towards and through the cutter 71 upon application of suitable pressure by the pressure head 51.

Although an exemplary form of the invention has been shown in detail in the accompanying drawings, and described in detail in the foregoing specification, it should be understood that the device may embody a wide variety of modifications without departing from the spirit of the invention or the scope of the appended claims.

I claim:

1. A cutting machine of the character described comprising a pair of spaced apart side walls, a sheet metal channel disposed between said side walls and having a slot in the bottom and opposed inturned flanges on the sides thereof, members securing said channel to the forward portions of said side walls, a bearing bracket disposed between said walls and having spaced ears between which is secured the rear portion of said channel, said bracket having a tongue extending through said slot, a pin extending through perforations in said ears and in said side walls, a lever pivotally supported on said pin, a pressure head slidable on said flanges and operatively connected with said lever, and a cutter removably mounted between said side walls forwardly of said channel, said tongue acting as a stop to limit the forward movement of said lever and the rearward movement of said pressure head.

2. A cutting machine of the character described comprising a pair of spaced apart side walls, a sheet metal channel disposed between said side walls, said channel having opposed inturned flanges on the side walls and a slot in the bottom wall thereof, a pair of vertical guide members secured to the forward portion of said channel and to said side walls, a cutter removably supported in said guide members, a pressure head having grooves on opposite sides thereof receiving said flanges and adapted for longitudinal movement thereon, a bearing bracket rearwardly disposed and consisting of spaced ears secured to said channel and an integral connecting transverse portion having an upstanding tongue projecting through the slot in said channel, a pin extending transversely of said channel through perforations in said ears and said side walls, and a lever operatively connected to said pressure head and pivotally supported on said pin, said tongue acting as a stop to limit the forward movement of said channel and the rearward movement of said pressure head.

3. A cutting machine of the character described comprising a pair of spaced apart side walls, a channel formed of sheet metal and disposed between said side walls, said channel having opposed inturned flanges on the side walls and a slot in the bottom thereof, a pair of vertical guide members secured to the forward portion of said channel and to said side walls, a cutter removably supported in said guide members, a pressure head having grooves on opposite sides thereof receiving said flanges and adapted for longitudinal movement thereon, a bearing bracket consisting of a casting comprising spaced ears and an integral connecting transverse portion having a tongue medially thereof, said bearing bracket being rearwardly disposed with the rearward end of said channel received between said ears and secured thereto, a pin extending transversely through perforations in said ears and said side walls, and a lever operatively connected to said pressure head and pivotally supported on said pin, said tongue extending upwardly through said slot and acting as a stop to limit the forward movement of said lever and the rearward movement of said pressure head.

HAROLD BLOOMFIELD.

REFERENCES CITED

The following references are of record in the file of this patent:

UNITED STATES PATENTS

| Number | Name | Date |
|---|---|---|
| 366,526 | Taylor | July 12, 1887 |
| 972,515 | Devlin | Oct. 11, 1910 |
| 1,977,339 | Johnson | Oct. 16, 1934 |
| 1,991,554 | Haynes | Feb. 19, 1935 |
| 2,093,755 | Garfunkel | Sept. 21, 1937 |
| 2,131,092 | Bloomfield | Sept. 27, 1938 |
| 2,283,030 | Bakewell | May 12, 1942 |
| 2,303,595 | Young | Dec. 1, 1942 |
| 2,407,924 | Garfunkel | Sept. 17, 1946 |

FOREIGN PATENTS

| Number | Country | Date |
|---|---|---|
| 490,250 | Great Britain | Aug. 11, 1938 |